US012776115B2

(12) United States Patent
Fishman

(10) Patent No.: US 12,776,115 B2
(45) Date of Patent: Oct. 27, 2026

(54) INTERACTIVE VIRTUAL REALITY ENVIRONMENT BASED ON BIOMIMICRY

(71) Applicant: Cynthia Fishman, Denver, CO (US)

(72) Inventor: Cynthia Fishman, Denver, CO (US)

( * ) Notice: Subject to any disclaimer, the term of this patent is extended or adjusted under 35 U.S.C. 154(b) by 138 days.

(21) Appl. No.: 18/672,859

(22) Filed: May 23, 2024

(65) Prior Publication Data

US 2024/0394992 A1 Nov. 28, 2024

Related U.S. Application Data

(60) Provisional application No. 63/504,225, filed on May 25, 2023.

(51) Int. Cl.
*G06T 19/20* (2011.01)

(52) U.S. Cl.
CPC ...... *G06T 19/20* (2013.01); *G06T 2219/2004* (2013.01)

(58) Field of Classification Search
CPC ........................ G06T 19/20; G06T 2219/2004
See application file for complete search history.

(56) References Cited

U.S. PATENT DOCUMENTS

| | | | | |
|---|---|---|---|---|
| 9,183,560 B2 | 11/2015 | Abelow | | |
| 10,885,710 B2 * | 1/2021 | Holz | G02B 27/017 | |
| 11,732,467 B2 | 8/2023 | Fishman et al. | | |
| 2008/0134056 A1 * | 6/2008 | Shuster | A63F 13/12 | 715/757 |
| 2008/0167129 A1 * | 7/2008 | Aaron | A63F 13/65 | 463/42 |
| 2010/0271394 A1 * | 10/2010 | Howard | G06F 3/011 | 345/633 |
| 2012/0113144 A1 * | 5/2012 | Adhikari | G06Q 30/0623 | 345/633 |
| 2013/0249902 A1 * | 9/2013 | Byrne | G06T 19/006 | 345/419 |

(Continued)

OTHER PUBLICATIONS

Chandler et al., Immersive landscapes modelling ecosystem reference conditions in virtual reality , Mar. 17, 2021 , Springer (Year: 2021).*

(Continued)

*Primary Examiner* — YuJang Tswei
(74) *Attorney, Agent, or Firm* — Trenner Law Firm, LLC; Mark Trenner

(57) ABSTRACT

Systems and methods of providing a user with an interactive virtual reality (VR) environment based on biomimicry are disclosed. An example method includes generating, via at least one VR output device, a virtual reality environment for the user simulating a natural ecosystem. The example method also includes receiving, via at least one VR input device, a user selection of a biomimicry design principle from the simulated natural ecosystem. The example method also includes processing the user selection of the biomimicry design principle, via at least one computer processor, to apply the biomimicry design principle to a technology in an urban environment. The example method also includes rendering for the user, via one or more VR output device, a simulation of the urban environment with the technology incorporating the biomimicry design principle.

19 Claims, 13 Drawing Sheets

(56) References Cited

U.S. PATENT DOCUMENTS

| | | | | |
|---|---|---|---|---|
| 2013/0286045 | A1* | 10/2013 | Kweon | G06T 11/00 345/633 |
| 2017/0221267 | A1* | 8/2017 | Tommy | G09B 5/06 |
| 2021/0241532 | A1 | 8/2021 | Daniels et al. | |
| 2023/0214925 | A1* | 7/2023 | Cella | G06Q 30/06 705/37 |

OTHER PUBLICATIONS

Hannah Erickson et al., XR in Sustainability A Holistic Appr XR in Sustainability A Holistic Approach to Testing T esting Transportation Design Proposals 2022 , Syracuse University (Year: 2022).*
Jamei et al., Biomimicry and the Built Environment Learning from Natures Solutions , Aug. 16, 2021 , mdpi (Year: 2021).*
Nima Rezaei et al., "Transdisciplinarity", 2022, Springer (Year: 2022).*
Stevens et al, "The Art and Science of BiomimicryâAbstracting Design Principles from Nature", 2022, Springer (Year: 2022).*
Stevens et al., Cultivating Cooperative Relationships: Identifying Learning Gaps When Teaching Students Systems Thinking Biomimicryâ, 2022, MDPI (Year: 2022).*
Chandler, et al. "Immersive landscapes: modelling [sic] ecosystem reference conditions in virtual reality" Landscape Ecology, 2021.
BBC Studios "BBC Earth Life—A new way to experience stories from the natural world" available on the Internet at https://www.bbcstudiosgamesandinteractive.com/portfolio/bbc-earth-life-in-vr/ at least as early as May 5, 2023.
Dwivedi, et al. "Metaverse beyond the hype: Multidisciplinary perspectives on emerging challenges, opportunities, and agenda for research, practice and policy" International Journal of Information Management, 2022.
Eva Pietroni, "Experience Design, Virtual Reality and Media Hybridization for the Digital Communication Inside Museums" Applied System Innovation, Oct. 2019.
Infranet "Artificial Nature" available on the Internet at https://artificialnature.net at least as early as May 5, 2023, copyright 2017.
Sanctuaries 360: Explore the Blue "An immersive 360 view of your national marine sanctuaries" Office of National Marine Sanctuaries available on the Internet at https://sanctuaries.noaa.gov/vr/ at least as early as May 5, 2023.
Museum Next "How Museums are using Augmented Reality" available from the Internet at https://www.museumnext.com/article/how-museums-are-using-augmented-reality/ at least as early as May 5, 2023.and updated Feb. 1, 2024.
Environment & Society Portal "Discover our Virtual Exhibitions" available from the Internet at https://www.environmentandsociety.org/exhibitions at least as early as May 5, 2023.

* cited by examiner

INTERACTIVE VIRTUAL REALITY ENVIRONMENT BASED ON BIOMIMICRY

PRIORITY CLAIM

This application claims the priority filing benefit of U.S. Provisional Patent Application No. 63/504,225 filed May 25, 2023 for "Interactive Virtual Reality Environment Based On Biomimicry" of Cynthia Fishman, hereby incorporated by reference in its entirety as though fully set forth herein. This application is also related to U.S. patent application Ser. No. 15/929,933 filed May 29, 2020 for "Acoustic Tile" of Cynthia Fishman et al., hereby incorporated by reference in its entirety as though fully set forth herein.

BACKGROUND

Biomimicry is defined as the design and production of materials, structures, and systems that are modeled on biological entities and processes. By way of illustration, if we zoom in on the fuzzy parts of a cabbage tree emperor moth, we see overlapping, spiky scales. When we go farther, we see that there are multiple layers of each scale, each with hollow pores. So how does the structure function? As sound waves from a bat hit the moth, they bounce farther and farther inward, almost completely absorbing the sound, rendering the moth nearly or completely "invisible" to a bat.

The environments in which we live can be improved by applying the principles of nature (biomimicry). For example, an acoustic tile is disclosed in U.S. patent application Ser. No. 15/929,933 which has a porous structure including overlapping layers based on biomimicry of the cabbage tree emperor moth.

The concept of biomimicry has had books written about it, card games created, and educational workshops, classes, and even college degrees offered on the subject. Still, most people are not familiar with biomimicry, and even fewer people do not know how to practice it.

It is desired to be able to teach these principles in a fun and interactive way, so that others can help to implement these teachings into the products of everyday life today and in the future.

DETAILED DESCRIPTION

Figure 1:
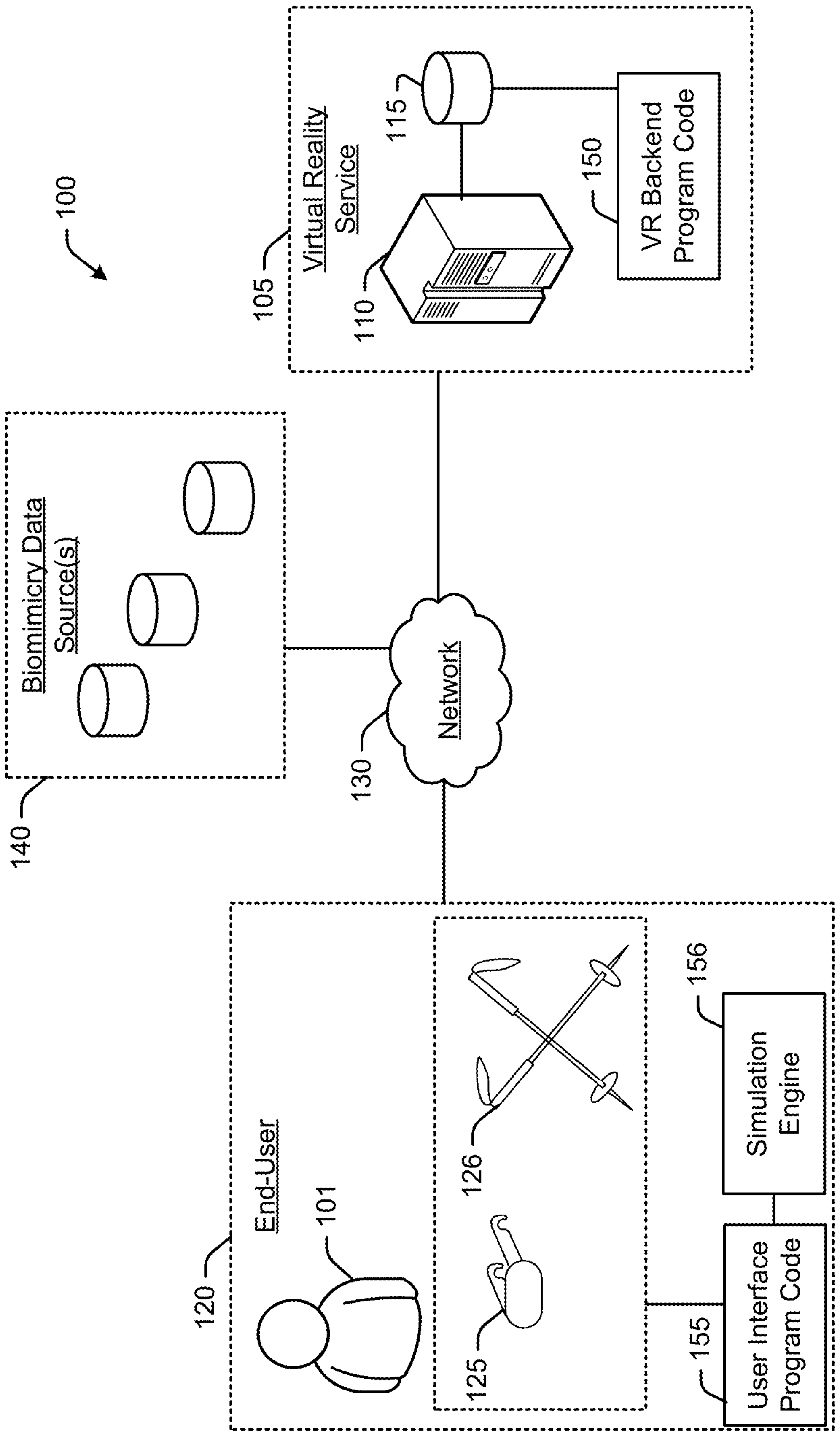
FIG. 1 is a high-level block diagram of an example networked computer system which may implement the interactive virtual reality (VR) environment based on biomimicry application.

An interactive virtual reality (VR) environment based on biomimicry is disclosed. The VR environment virtually "transports" the user to other places, such that it appears (and may even feel) like the user is actually there, enabling the user to interact (e.g., touch, feel, and communicate) in computer-rendered spaces referred to herein as an interactive VR environment. In an example, the interactive environment incorporates principles of biomimicry into construction and design elements, while being grounded in actual or real geographical places (e.g., actual ecosystems and cities) through the use of VR.

Virtual reality (VR) refers to the rendering of an environment that simulates visual, auditory and other sensory aspects for a user, so that the user feels as though the rendered environment is a "true to life" or "real life" environment. The rendered environment is simulated as a natural stereoscopic view for the user via computer generated output (e.g., right-eye and left-eye images) to present a three-dimensional (3D) object or scene. The user thus perceives a 3D environment, creating the illusion that computer-rendered objects and/or scenes have actual depth and that the user is present in that environment. Other sensory output may also be deployed (e.g., audio, scent, temperature, touch) to extend the VR environment to other senses of the user, including but not limited to, sound, taste, touch, temperature, etc., to create an even more immersive experience for the user.

In an example, the interactive virtual reality environment based on biomimicry includes hardware and software for generating a virtual reality environment of a natural ecosystem, selecting biomimicry design principles from the natural ecosystem, applying the biomimicry design principles to an urban environment, and presenting the urban environment incorporating the biomimicry design principles as a futuristic virtual reality environment for the user.

In an example, the interactive virtual reality environment based on biomimicry enables the user to choose a location on a map and explore ecosystems, biomes, habitats, and/or natural locations to learn about different organisms in their natural habitats.

In an example, the interactive virtual reality environment based on biomimicry enables the user to interact with the organisms and gather information such as their basic natural history and fun and interesting facts, a function that the organism has solved, the strategy of how the organism solved the function, and an abstracted design principle (ADP). The ADP is similar to a design prompt that has all the biology removed so that someone can utilize it in numerous application ideas that they brainstorm.

In an example, the interactive virtual reality environment based on biomimicry enables the user to explore a hypothetical city of the future that is based on a current city in the same general location (e.g., the same state) that the ecosystem is located, so as to incorporate local biomimicry design principles into the urban environments within similar geographical areas.

In an example, the interactive virtual reality environment based on biomimicry leads the user by a virtual guide around the city. The virtual guide points out sustainable, resilient, regenerative features of the city. The virtual guide shows the user a future technology and asks the user to practice biomimicry by matching the technology to an organism it already encountered during their "travels" to the natural habitat, so that the user sees how that organism can inspire different technologies.

It is noted that the term "technology" as used herein refers to machinery, architecture elements, and/or equipment (devices, apparatus, systems, subsystems) that are developed from the application of scientific knowledge to provide a function and/or solve a problem. A non-limiting example of a technology, as that term is used herein, is a water filtration system (which may include subsystems and/or one or more devices that filter water).

In an example, the interactive virtual reality environment based on biomimicry highlights specific information about each of the organisms in the ecosystem. The information collected in the natural habitat is the basis of the biomimicry research, and can be stored as data in the user's field journal (an electronic journal stored in computer-readable memory), to be accessed by the user later (e.g., in the virtual urban environment).

In an example, the interactive virtual reality environment based on biomimicry enables the user to travel to a future version of an urban environment and match the biomimicry strategy to a technology such as a design installation. When the user correctly matches the organism to the technology, the user may receive prizes or rewards (e.g., monetary, physical, and/or virtual), such as a special virtual lens that allows the user to see the VR urban environment "through the eyes" of another species as if the user is that other species (e.g., a butterfly).

The interactive virtual reality environment based on biomimicry disclosed herein makes the concept of biomimicry accessible to everyone, even those with no background in biomimicry. It can be used to help educate the public about the advantages of incorporating biomimicry into the design of buildings and even entire communities.

The interactive virtual reality environment based on biomimicry disclosed herein also helps address public attitudes toward climate change. While the amount of scientific data about the changing climate is prolific, it tends to drown out the positive steps being taken. This leads many to battle eco-depression related to climate change. By creating an educational virtual reality environment based on biomimicry, more people can be reached with solutions to climate change which are based on biomimicry, in a format that is easily accessible to everyone regardless of age or education, as opposed to books and articles trying to promote hope for the future but with a more limited audience.

The interactive virtual reality environment based on biomimicry can help to educate many people about the possible applications of biomimicry within the urban or other man-made or built environment. The interactive virtual reality environment based on biomimicry also solves the problem of showing participants what a regenerative, resilient, and sustainable future could look like, in order to instill optimism related to the climate crisis.

Before continuing, it is noted that as used herein, the terms "includes" and "including" mean, but is not limited to, "includes" or "including" and "includes at least" or "including at least." The term "based on" means "based on" and "based at least in part on." It is also noted that the term "virtual reality" (or "VR") as used herein, refers to traditional notions of VR, augmented reality (AR), non-immersive VR, semi-immersive VR, fully immersive VR, collaborative VR, mixed reality (a combination of real objects/environment and computer-generated objects/environment), and any future developments of the technology for providing a simulated environment based at least in part on computer output.

FIG. 1 is a high-level block diagram of an example networked computer system 100 which may implement the interactive virtual reality (VR) environment based on biomimicry application. The VR environment can be implemented via hardware and software capable of processing input and generating output corresponding to the VR environment at sufficiently high speeds that provide the user with a realistic visual rendering of spatial places and/or objects (living and nonliving).

Examples of VR hardware of the system 100 that implement the VR environment can include, but are not limited to computing systems, sensors (input), and sensory devices (output). Input sensors may include, but are not limited to, cameras and other optical sensors, motion sensors, temperature sensors, eye movement sensors, to name only a few examples. Input sensors may be provided as wearable devices 125 (e.g., gloves, bands, glasses, clothing) and/or user operated objects via a VR controller 126 (e.g., conventional gaming controller, controller-adapted hiking sticks, controller-adapted flash lights, etc.) and/or in the physical space around the user (e.g., speakers, displays, etc.).

Sensory devices for generating output by system 100 may also be provided as user-wearable devices 125 (e.g., gloves, bands, glasses, clothing) and/or user operated objects 126 (e.g., controller-adapted hiking sticks, controller-adapted flash lights, etc.) and/or in physical space around the user. Sensory devices may include visual displays (e.g., glasses, a computer monitor), tactile feedback devices for feel, scent generating devices for the sense of smell, sound generating devices for auditory, and other devices now known or later developed. Computer components, such as graphic cards, sound cards, vector accelerator cards, compressor accelerator cards, etc. (also known as process accelerator cards) of system 100 may also be provided to implement the VR environment.

Examples of VR hardware in system 100 may further include tracking systems/subsystems. Tracking systems/subsystems may be implemented to track a position, orientation, speed and/or direction of movement of the user (e.g., the user's arms, hands, legs, head, fingers, and even the user's eyes) in the virtual environment. Tracking devices can be implemented in any suitable form, including but not limited to mechanical, electromagnetic, ultrasonic, optical and infrared trackers.

The example system 100 for providing a VR environment may be implemented with any of a wide variety of computing devices, such as, but not limited to, stand-alone desktop/laptop/netbook computers, workstations, server computers, blade servers, mobile devices, and appliances (e.g., devices dedicated to providing a service), to name only a few examples. In an example, the interactive VR environment based on biomimicry application is implemented as application program code, such as user interface application 155 and/or simulation engine 156, for output on one or more virtual reality devices and/or other output device(s).

Each of the computing devices for implementing the interactive virtual reality (VR) environment based on biomimicry application may include memory, storage, and a degree of data processing capability at least sufficient to manage a communications connection either directly with one another or indirectly (e.g., via a network). At least one of the computing devices is also configured with sufficient processing capability to execute the program code described herein for implementing the features of the interactive VR environment based on biomimicry application.

By way of more specific examples, the system 100 may include a host 110 providing an interactive VR environment service 105. The service 105 may be accessed by a user 101 via a client device (e.g., one or more virtual reality devices executing the interactive VR environment application 155). For purposes of illustration, the interactive VR environment based on biomimicry application service 105 may be an online data processing service executing on a host 110 configured as a server computer with computer-readable storage 115.

Example services provided for the interactive VR environment based on biomimicry application may include general purpose computing services (e.g., access to data sets and/or audio and/or video recordings hosted on the Internet or as dynamic data endpoints for any number of client applications). Services also include interfaces to application programming interfaces (APIs) executable by the interactive VR environment.

The end-user, or client 120, may be implemented via client device(s) as any suitable computer or computing device(s) capable of accessing the host 110 and providing the virtual reality environment for output to the user or participant 101. As already noted, the client 120 may be the user's VR device executing the interactive VR environment application 155. Host 110 and client 120 are not limited to any particular type of device(s). Although, it is noted that the operations described herein for the interactive VR environment based on biomimicry application may be executed by VR backend program code 150 residing on a server computer on the service provider side 105 and/or program code 155, 156 on the user side 120 via one or more network 130.

The communication network 130 may be a local area network (LAN) and/or wide area network (WAN). In one example, the network 130 includes the Internet or other mobile communications network (e.g., a 3G, 4G or 5G or next generation mobile device network). Network 130 may also provide greater accessibility to the interactive VR environment based on biomimicry application for use in distributed environments, for example, where more than one user may have input and/or receive output from the service 105.

The host 110 and client 120 may be provided on the network 130 via a communication connection, such as via an Internet service provider (ISP). In this regard, the client 120 is able to access features of the interactive VR environment based on biomimicry application directly via the network 130, or via an agent, such as another network.

In an example, the program code 150 for executing the interactive VR environment based on biomimicry application has access to both the client 120 and the service 105 in the networked computer system 100. For example, the service 105 may be a cloud-based service, wherein the program code is executed on at least one computing device local to the client 120, but having access to the service 105 in the cloud computing system.

In addition, the interactive VR environment based on biomimicry application may access at least one source 140 of content. Content may include, but is not limited to, biomimicry data, ecosystem data, and/or urban environment data. The source may be part of the interactive VR environment based on biomimicry application, and/or the source may be physically distributed in the network and operatively associated with the service 105. In any implementation, the source 140 may include any content. For example, the source 140 may include databases for providing information, applications for providing application data, storage resources for providing online storage facilities. There is no limit to the type or amount of content that may be provided by the source 140. In addition, the content may include unprocessed or "raw" data, or the content may undergo at least some level of processing.

As mentioned above, the program code 150 and/or 155 may be executed for the interactive VR environment based on biomimicry application by any suitable computing device (s). Program code used to implement features of the interactive VR environment based on biomimicry application can be better understood with reference to FIG. 2 and the following discussion of various example functions. However, the operations described herein for the interactive VR environment based on biomimicry application are not limited to any specific implementation with any particular type of program code.

Figure 2:
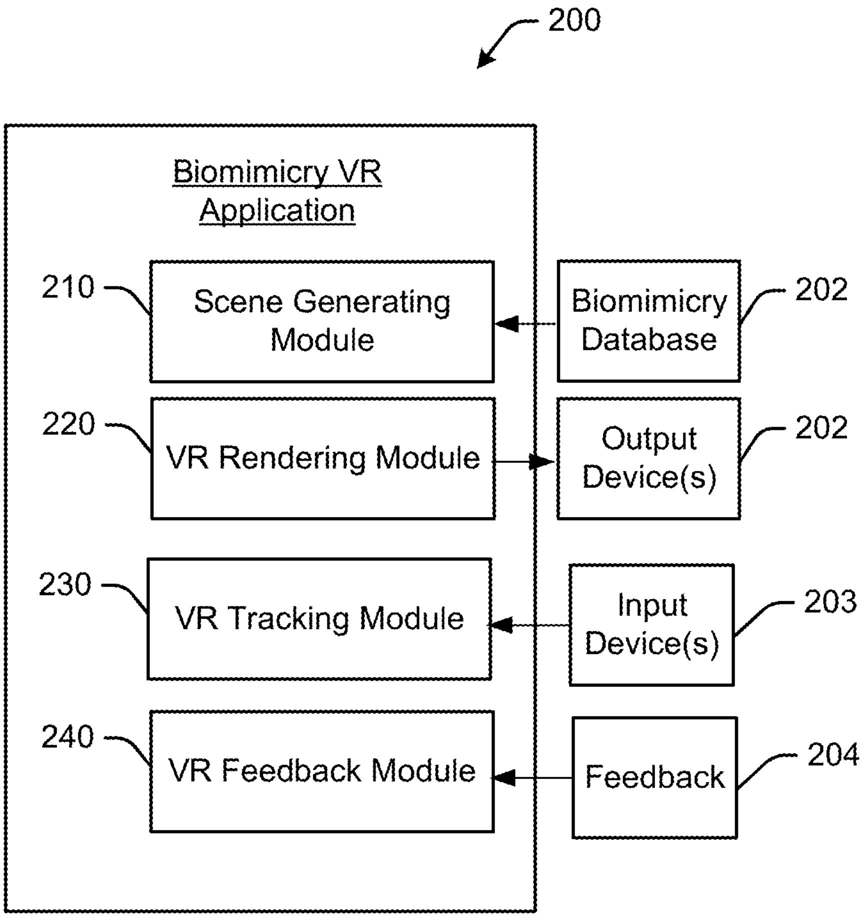
FIG. 2 shows an example architecture of machine readable instructions, which may be executed by the interactive virtual reality (VR) environment based on biomimicry application.

FIG. 2 shows an example architecture of machine readable instructions, which may be executed by the interactive VR environment based on biomimicry application. In an example, the program code discussed above with reference to FIG. 1 may be implemented in machine-readable instructions (such as but not limited to, software or firmware). The machine-readable instructions may be stored on a non-transient computer readable medium and are executable by one or more processors to perform the operations described herein. It is noted, however, that the components shown in FIG. 2 are provided only for purposes of illustration of an example operating environment, and are not intended to limit implementation to any particular system or device.

The program code executes the function of the architecture of machine readable instructions 200 as self-contained modules of the interactive VR environment based on biomimicry application. These modules can be integrated within a self-standing application, or may be implemented as agents that run on top of an existing program code.

In an example, the architecture of machine readable instructions 200 for the interactive VR environment based on biomimicry application may include a scene generating module 210 for generating a scene for the user (e.g., by serving stereoscopic images). The scene may be rendered for the user as an ecosystem in one instance, and an urban environment in another instance. The scene may also include objects (living and nonliving), such as a visual representation of the user's controller (e.g., hiking sticks or other VR controller), animals living in their natural habitat, virtual gateways, other people, etc.

In an example, the architecture of machine readable instructions 200 for the interactive VR environment based on biomimicry application may include a VR rendering module 220 for rendering the scene on a user VR device 202 and/or supplemental device (e.g., for other users to see).

In an example, the architecture of machine readable instructions 200 for the interactive VR environment based on biomimicry application may include a VR tracking module 230 for receiving user positions/orientations from input devices 203 within the scene (e.g., based on user movement and/or motions). The architecture of machine readable instructions 200 may also receive input from sensors (e.g., temperature).

In an example, the architecture of machine readable instructions 200 for the interactive VR environment based on biomimicry application may include a VR feedback module 240 for receiving feedback 204 (e.g., user selections from the scene via the controller-adapted hiking sticks).

The architecture of machine readable instructions 200 may implement an interactive virtual reality (VR) environment based on biomimicry via at least one VR output device that generates a virtual reality environment for the user simulating a natural ecosystem. At least one VR input device may receive a user selection of a biomimicry design principle from the simulated natural ecosystem. At least one computer processor may process the user selection of the biomimicry design principle and apply the biomimicry design principle to a technology in an urban environment. A computer-generated simulation of the urban environment shows the technology incorporating the biomimicry design principle. An example is provided by way of illustration with reference to FIGS. 3-11 described in more detail below.

In an example, at least one computer processor matches the biomimicry design principle with the technology based on the ability of the biomimicry design principle to address a problem solved by the technology when the biomimicry design principle is incorporated into the technology. An example is provided by way of illustration with reference to FIGS. 3-11 described in more detail below.

In an example, at least one computer processor selects the biomimicry design principle from a plurality of biomimicry design principles having naturally occurring characteristics that address at least one problem currently solved by the technology in a different way than the technology currently solves the at least one problem. An example is provided by way of illustration with reference to FIGS. 3-11 described in more detail below.

In an example, at least one sensor (e.g., a motion detector) may receive a direction for the user to navigate or travel in the virtual reality environment. At least one VR output device may render a naturally occurring plant, animal, and/or object in the simulated natural ecosystem corresponding to the direction the user travels. An example is provided by way of illustration with reference to FIGS. 3-11 described in more detail below.

In an example, a user tracking device may generate a user selection of a naturally occurring plant, animal, and/or object in the simulated natural ecosystem. A VR display and/or a VR audio device may output the biomimicry design principle corresponding to the user selection of the naturally occurring plant, animal, and/or object in the simulated natural ecosystem. An example is provided by way of illustration with reference to FIGS. 3-11 described in more detail below.

In an example, a VR display may render a map for the user. A user tracking device may provide a user selection of a location on a map for virtually exploring ecosystems, biomes, habitats, and/or natural locations to learn about different living organisms in their natural habitats. An example is provided by way of illustration with reference to FIGS. 3-11 described in more detail below.

In an example, a VR output device may render different living organisms in the virtual reality environment for the user to virtually gather information about the different living organisms. The information may include, but is not limited to, at least a function that the different living organisms has solved, the strategy of how the different living organisms solved the function, and an abstracted design principle (ADP) with all biology removed so that the user can utilize the information about the different living organisms in application ideas of the user. An example is provided by way of illustration with reference to FIGS. 3-11 described in more detail below.

The architecture of machine readable instructions 200 may be better understood as it implements an interactive virtual reality (VR) environment based on biomimicry, as illustrated in FIGS. 3-11 described below.

Figure 3:
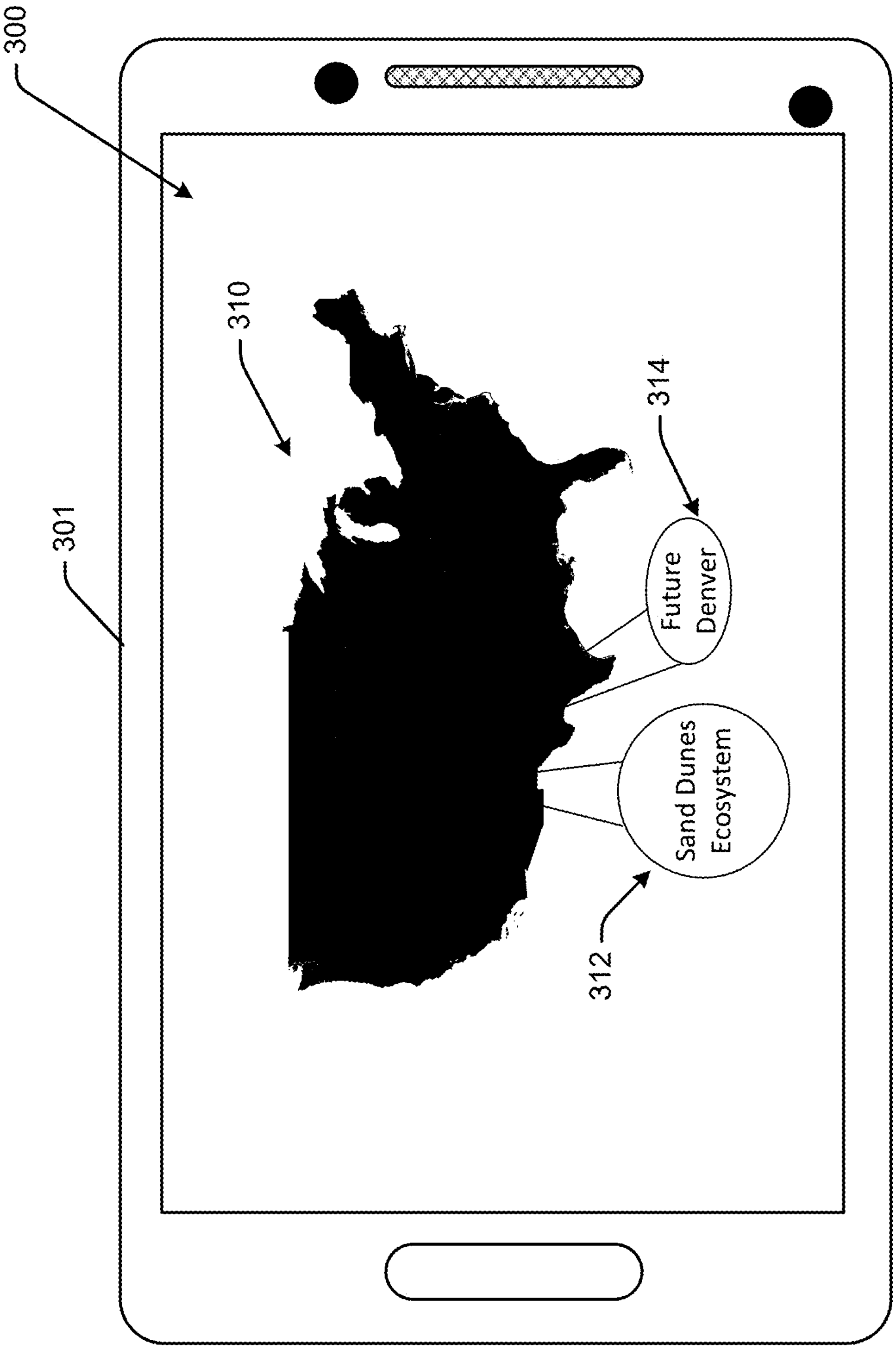
FIG. 3 is an illustration of an example user interface (UI) which may be generated by the interactive virtual reality (VR) environment based on biomimicry application, wherein a map is displayed for selecting a starting location.

FIG. 3 is an illustration of an example graphical user interface (GUI) 300 which may be generated by the interactive VR environment based on biomimicry application, wherein a map is displayed for selecting a starting location. The output may be presented to the user in the form of a virtual reality interactive exhibit with game-like characteristics. The participant may wear VR devices (e.g., goggles or glasses), hold and control VR objects (e.g., controller-adapted hiking sticks), and interact with the VR environment to experience the exhibit and learn about biomimicry design principles. The visuals may also be projected onto a nearby screen (e.g., another participant's mobile device 301 such as the one shown in FIG. 3) so that others can observe the concept, but in a more traditional viewing method.

It is noted that while the GUI 300 is illustrated in FIG. 3 as it may be displayed on a mobile device 301, the VR environment may be output on any suitable device or devices, including but not limited to, mobile phones, tablets, desktop and/or laptop computing devices, VR headsets, VR gloves, VR glasses, and/or other specialized VR device(s).

The interactive VR environment based on biomimicry application allows participants to understand and practice the design lens of biomimicry through the use of virtual reality. Participants are able to choose a location on a map 310 and explore ecosystems, biomes, habitats, and/or natural locations 312 to learn about different organisms in their natural habitats. Participants are able to interact with the animals and other organisms and gather information such as their basic natural history and fun and interesting facts, a function that the organism has solved, the strategy of how the organism solved the function, and an abstracted design principle (ADP). The ADP is similar to a design prompt that has all the biology removed so that someone can utilize it in numerous application ideas that they brainstorm.

Next participants are able to explore a hypothetical city of the future 314 that is based on a current city in the same state that the ecosystem is located. Participants are led by a guide around the city 314 which points out the sustainable, resilient, and regenerative features of the city. The guide then shows the participant a future technology and asks the user to practice biomimicry by matching the technology to an organism it already encountered during their "travels" to the natural habitat 312. This allows the participants to see how an organism can inspire different technologies.

FIGS. 4-11 are illustrations of example interaction between a user and a user interface (UI) which may be generated by the interactive VR environment based on biomimicry application.

Figure 4:
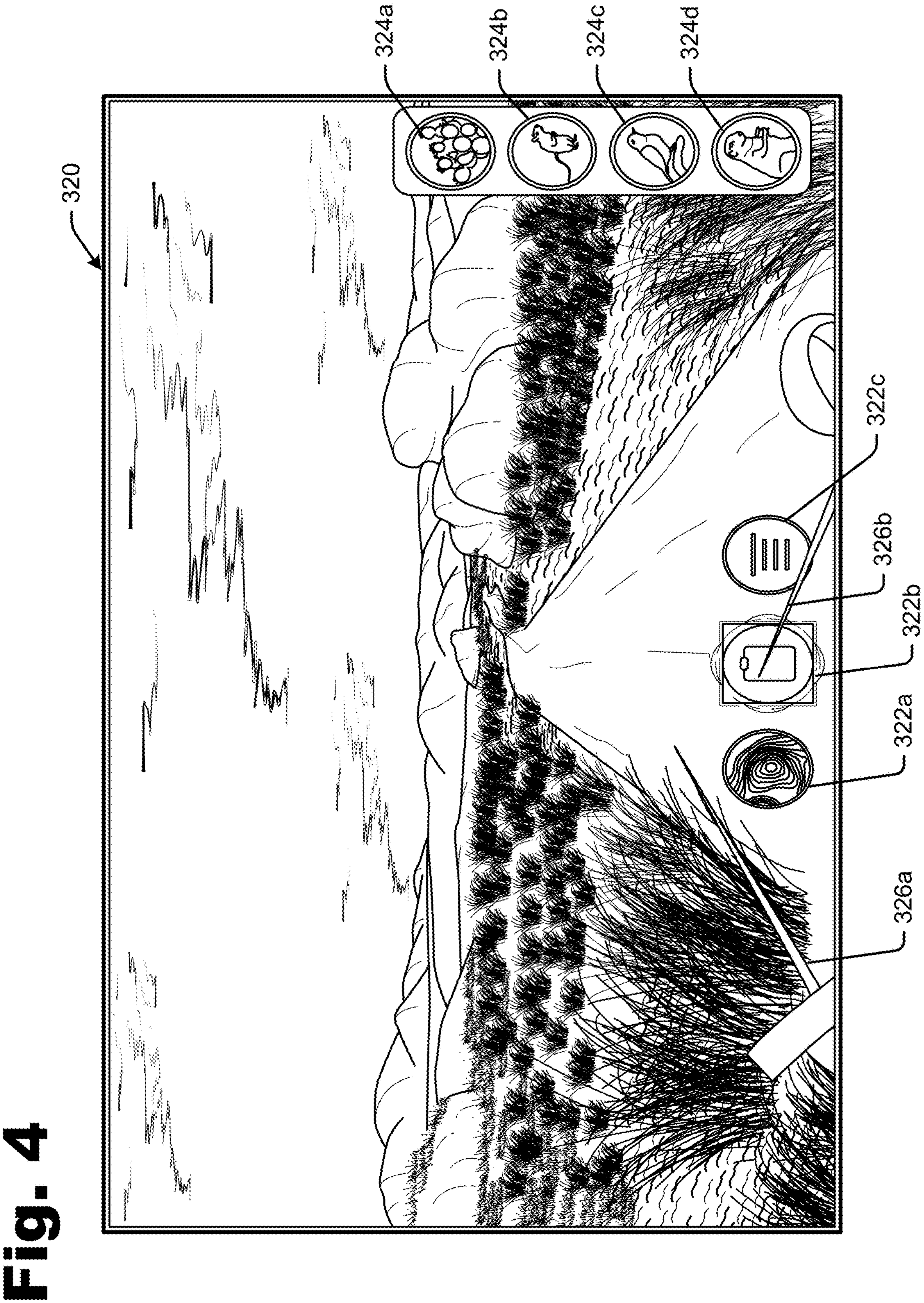
FIGS. 4-11 are illustrations of example interaction between a user and a user interface (UI) which may be generated by the interactive virtual reality (VR) environment based on biomimicry application.
Figure 5:
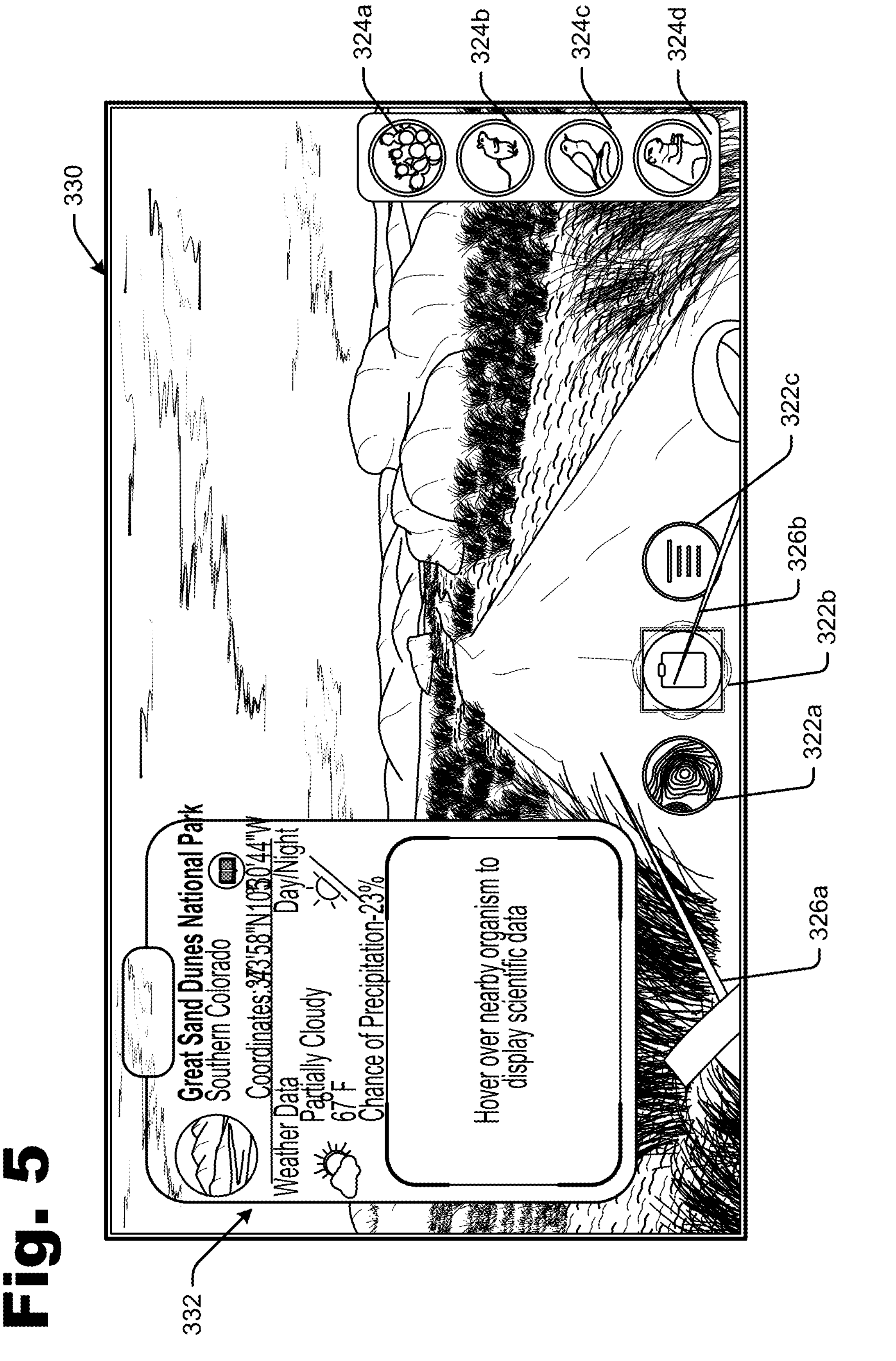

FIG. 4 shows an example of the interactive VR environment 320 based on the Great Sand Dunes National Park in Colorado. An example ecosystem is shown, along with user tools, including a button **322*a* to select a topographical map of the area, a button 322*b* to select a user notebook or field journal, and a button 322*c* to access more information. Also displayed are various elements or icons 324*a-d* for various plants and animals that the user can seek to find in the virtual Great Sand Dunes National Park. The user may make selections in the VR environment 320, and/or move in the VR environment 320 (e.g., down the pathway). In FIG. 4, a virtual rendition 326*a, b* of the hiking sticks is shown as it may be rendered substantially in real-time corresponding to the user's actual controller-adapted hiking stick (e.g., as detected by a tracking system or subsystem) to select the button 322*b* for the user's field journal. Upon selecting the button 322*b*, the user's field journal 332 is displayed for the user, as illustrated in the updated VR environment 330 illustrated in FIG. 5**.

Figure 6:
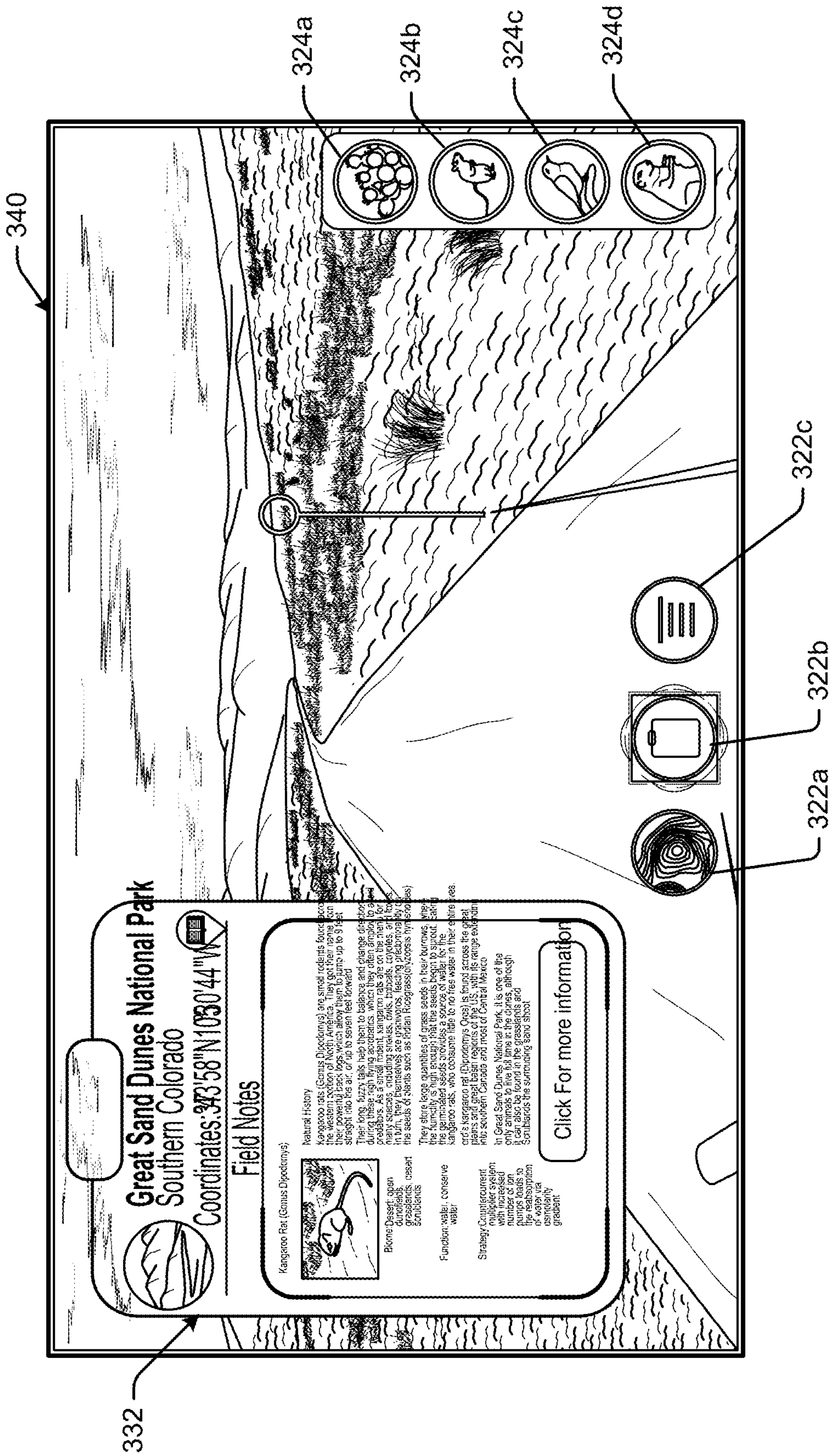

FIG. 6 shows an example of the interactive VR environment 340 now updated when the user has traveled down the pathway and located the kangaroo rat corresponding to element **324*b*. Information about the kangaroo rat is displayed in the user's field journal 332**.

In an example, the participant may interact with many organisms, but once they find a bluebird, prairie dog, cactus, and kangaroo rat (and/or other organisms, plants, animals), a pop-up window appears highlighting specific information about each of the organisms. The bluebird showcases how to modify color, the prairie dog showcases how to promote airflow, the cactus showcases how to sequester carbon, and the kangaroo rat showcases how to conserve water. It is noted that these are examples of organisms and/or functions and there can be different organisms and/or functions for that location and/or for other habitats.

The information collected is the basis of the biomimicry research and is stored as data in the participant's field journal to be accessed later.

Figure 7:
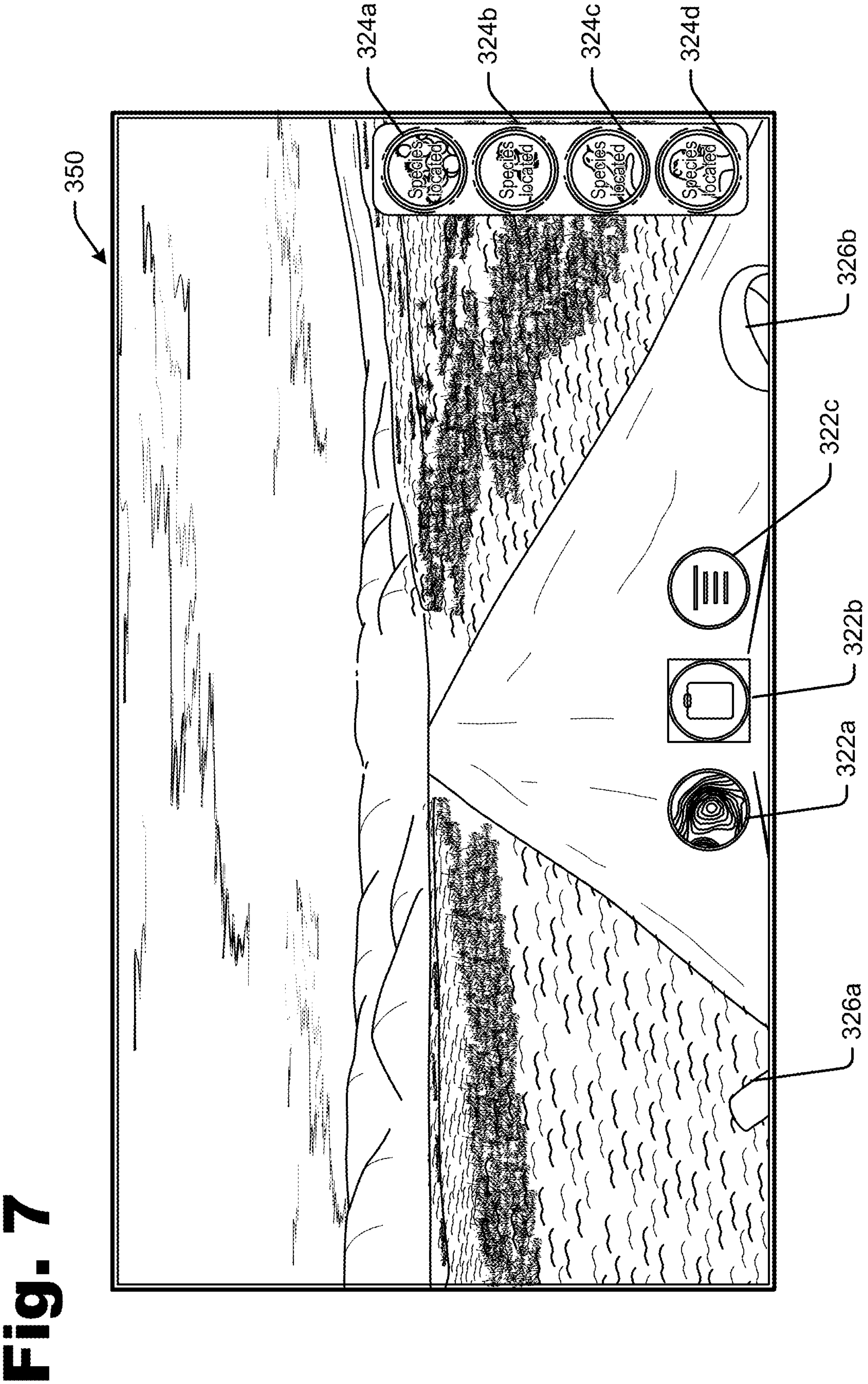

FIG. 7 shows an example of the interactive VR environment 350 now updated when the user has traveled further down the pathway. The elements or icons 324*a-d* are also shown as being "located" after the user has found all of the plants and animals they were to seek.

Figure 8:
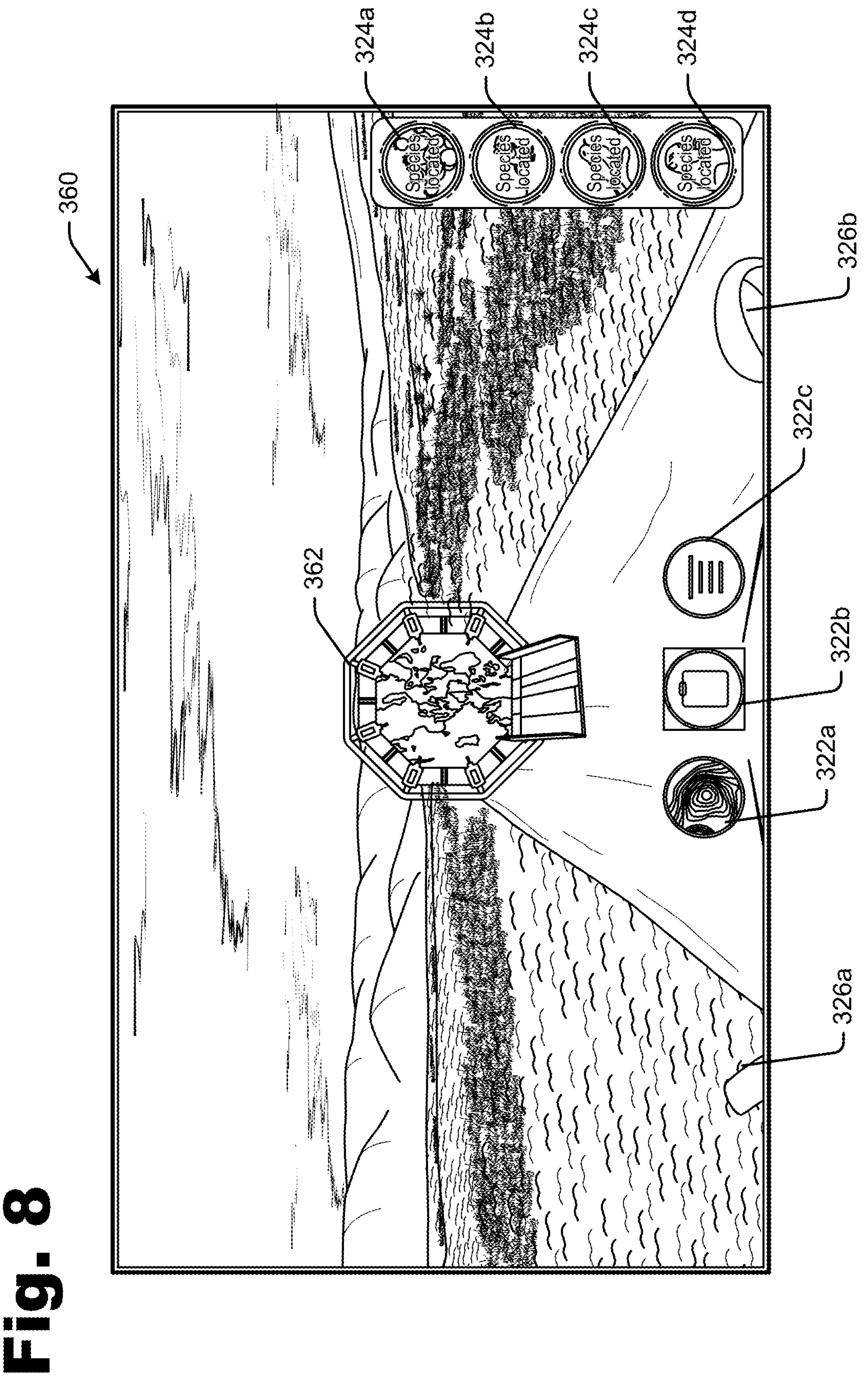

After all of the plants and animals have been located, and the user has been presented with information to learn about each, a virtual portal may be presented to the user. FIG. 8 shows an example of the interactive VR environment 360 now updated to display a virtual portal 362. Entering the virtual portal 362 enables the user to enter a transfer portal.

Figure 9:
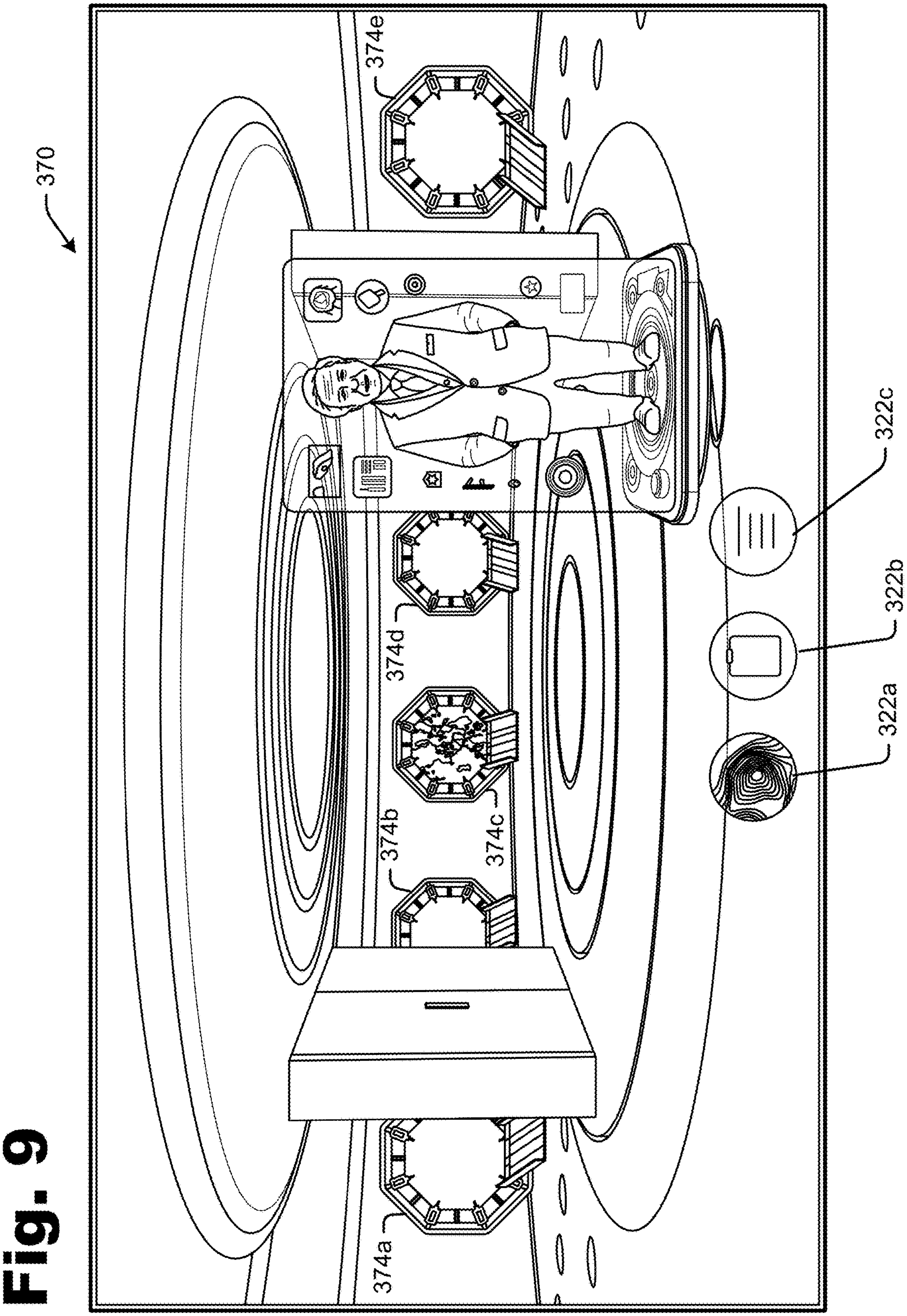

FIG. 9 shows an example of the interactive VR environment 370 now updated to display inside of the transfer portal. In this example, another person or virtual guide 372 is shown. The virtual guide 372 may be a famous biologist, park ranger, or other expert that can virtually share a message and/or knowledge about the biomimicry principles to be taught. The user may select from any of a number of doors 374*a-e* or passageways to enter into other realms (e.g., futuristic cities).

Figure 10:
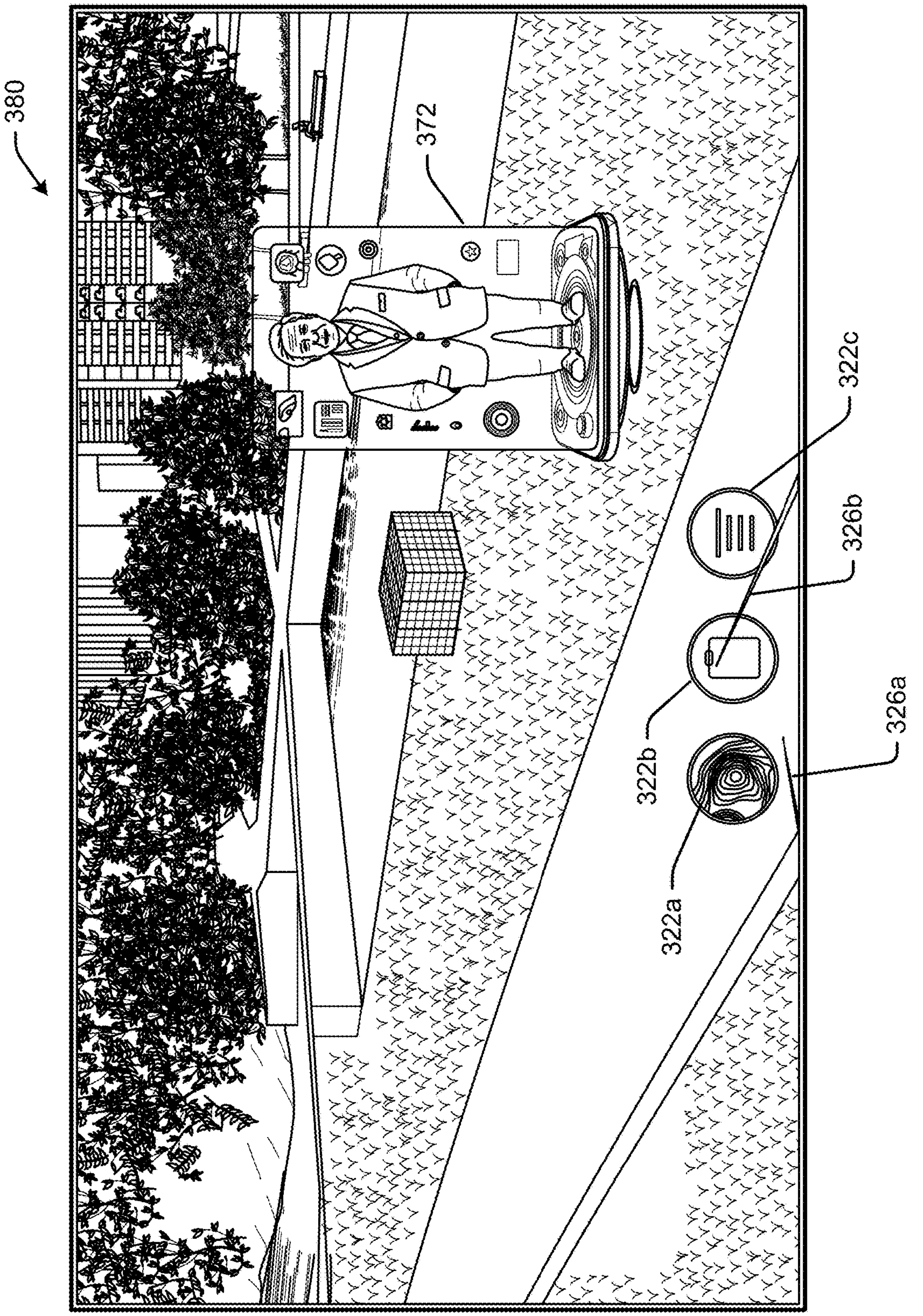

In this example, the user opens door 374*c* and is transported to a future version of the city of Denver, Colorado. FIG. 10 shows an example of the interactive VR environment 380 now updated to display a virtual future city of Denver. The guide 372 may also come with the user to the virtual future city of Denver. The user can explore the city and match notes from the natural environment, to possible designs of technology available in the virtual future city of Denver, in order to teach biomimicry design principles. For example, the bluebird's strategy may be applied to an art installation that was created with structural color, the prairie dog's strategy may be applied to a passive ventilation system used within a building, the cactus's strategy may be applied to a carbon sequestration machine found within the city that turns the carbon dioxide to chalk that is then used a building material.

Figure 11:
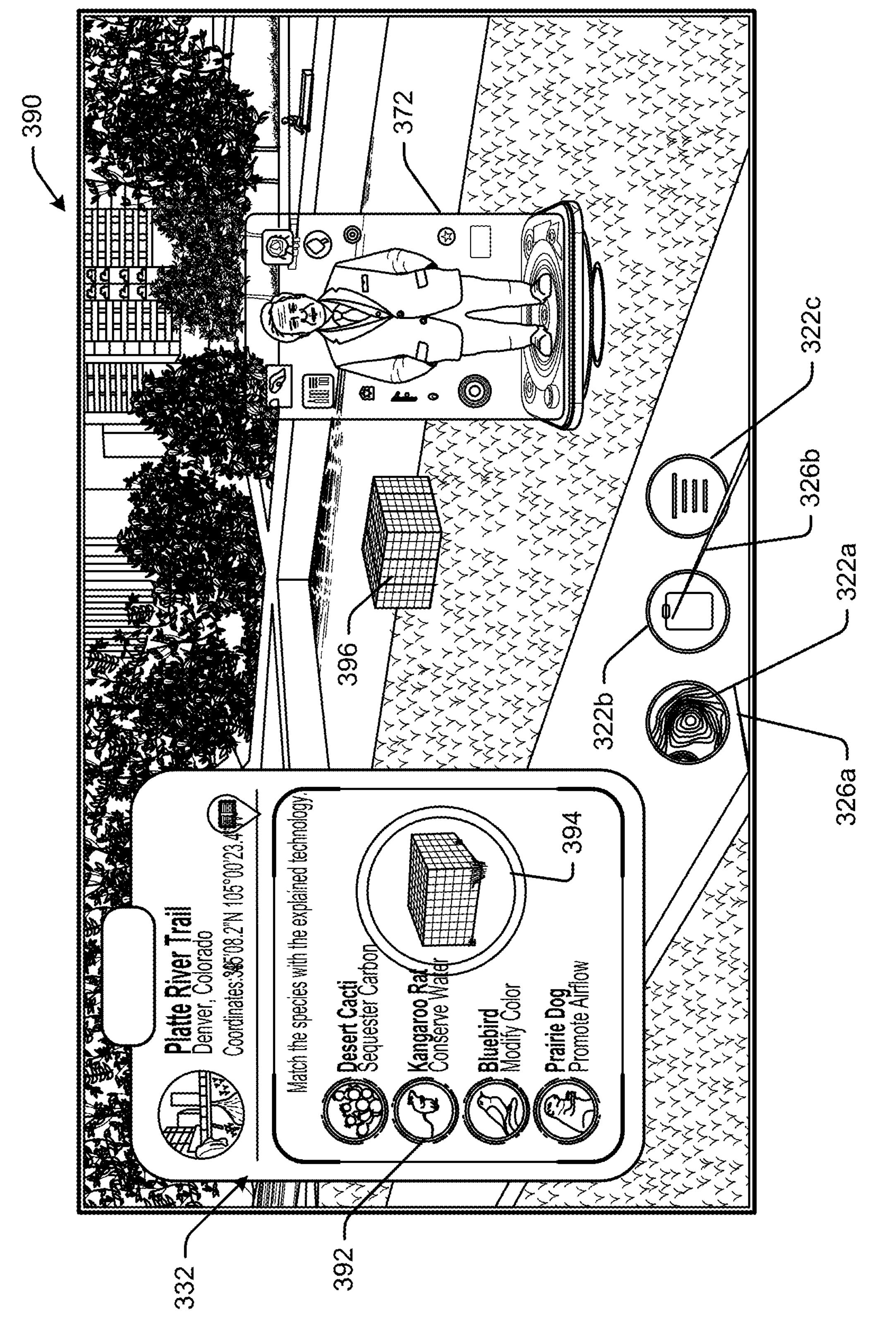

FIG. 11 shows an example of the interactive VR environment 390 now updated to display the user's field guide 332 in the virtual future city of Denver. In the example shown, the user has correctly matched an element or icon 392 for the kangaroo rat with an element or icon 394 for a water filter technology. The user has learned a principle of biomimicry, that the kangaroo rat's strategy to concentrate contaminants in its urine and filter water through its kidneys for reuse, can be applied to a water filtration technology 396 (e.g., a device) that is configured to similarly concentrate and remove liquid contaminants from a stream flowing through the city in order to be able to reuse the water for the city's human population.

When the participants correctly match the organism to the technology, they may receive prizes, such as special virtual lenses that allow them to see the city as if they were a bee (e.g., in ultra violet and electric charges around flowers). This exposes the participants to other ways to experience the world, literally through the eyes of other species.

Before continuing, it should be noted that the examples described above are provided for purposes of illustration, and are not intended to be limiting. Other devices and/or device configurations may be utilized to carry out the operations described herein.

Figure 12:
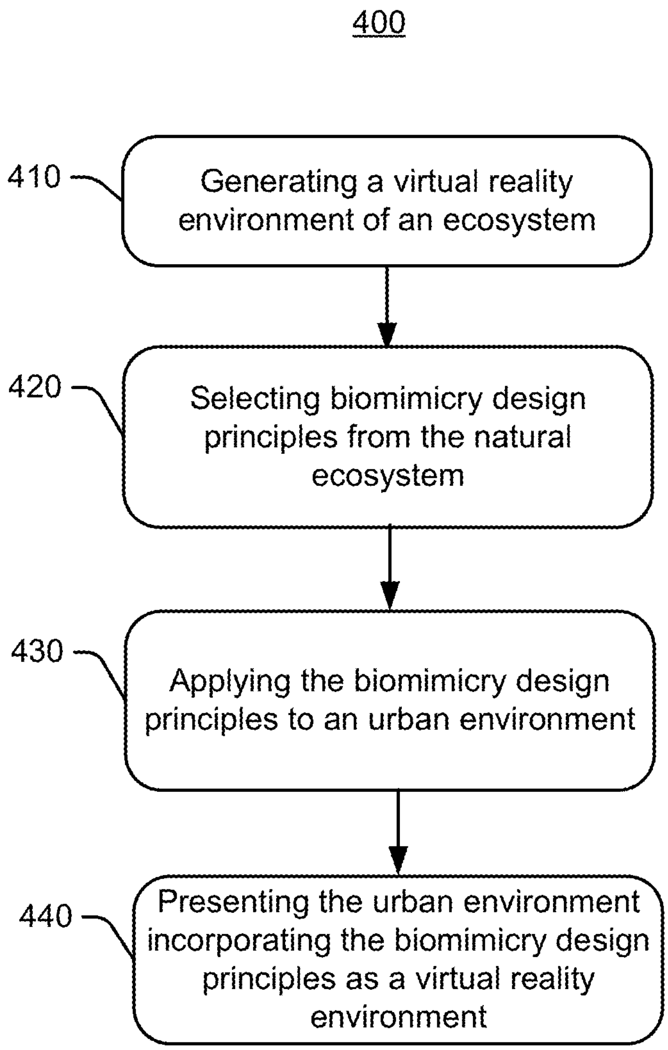
FIG. 12 is a flow chart illustrating example operations which may implement the interactive virtual reality (VR) environment based on biomimicry application.

FIG. 12 is a flow chart illustrating example operations 400 which may implement the interactive VR environment based on biomimicry application.

Operation 410 includes generating a virtual reality environment of a natural ecosystem (e.g., Great Sand Dunes in FIG. 3). Operation 420 includes selecting biomimicry design principles from the natural ecosystem. Operation 430 includes applying the biomimicry design principles to an urban environment (e.g., future Denver in FIG. 3). Operation 440 includes presenting the urban environment incorporating the biomimicry design principles as a virtual reality environment for the user.

The operations shown and described herein are provided to illustrate example implementations. It is noted that the operations are not limited to the ordering shown. Still other operations may also be implemented.

Figure 13:
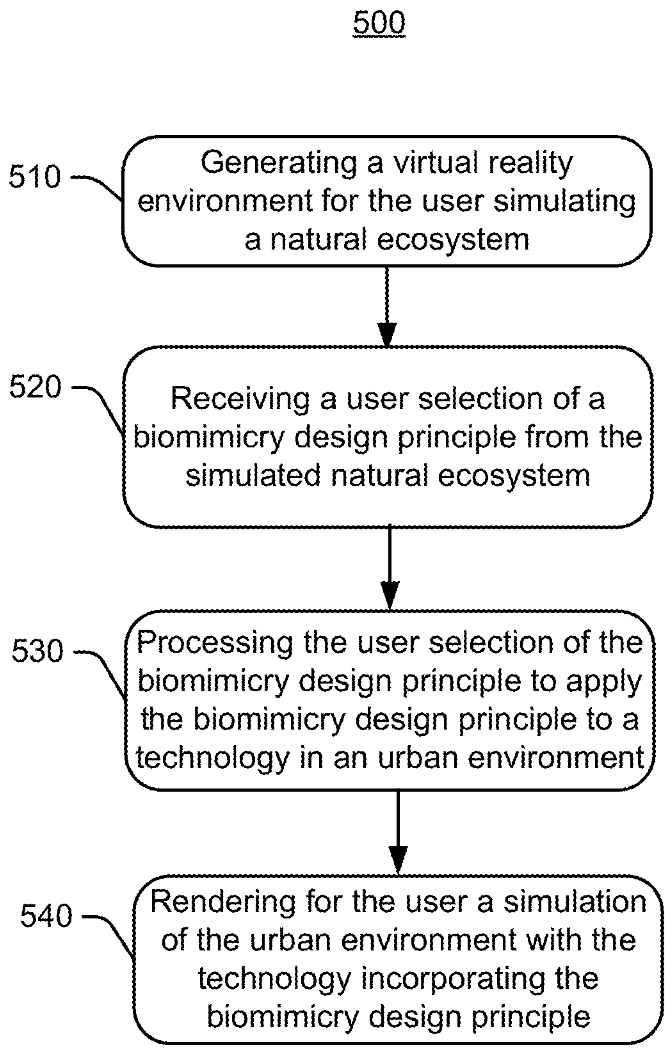
FIG. 13 is another flow chart illustrating example operations which may implement the interactive virtual reality (VR) environment based on biomimicry application.

By way of illustration, FIG. 13 is another flow chart illustrating example operations 500 which may implement the interactive VR environment based on biomimicry application. In an example, the operations include providing a multidimensional coordinate system, generating at least one VR element in the multidimensional coordinate system, and rendering the at least one VR element in a VR environment corresponding to a position in the multidimensional coordinate system.

More specifically, operation 510 includes generating (e.g., via at least one VR output device) a virtual reality environment for the user simulating a natural ecosystem. Operation 520 includes receiving (e.g., via at least one VR input device) a user selection of a biomimicry design principle from the simulated natural ecosystem. Operation 530 includes processing the user selection of the biomimicry design principle (e.g., via at least one computer processor) to apply the biomimicry design principle to a technology in an urban environment. Operation 540 includes rendering for the user (e.g., via at least one VR output device) a simulation of the urban environment with the technology incorporating the biomimicry design principle.

In an example, operations may further include matching the biomimicry design principle with the technology based on the ability of the biomimicry design principle to address a problem solved by the technology when the biomimicry design principle is incorporated into the technology.

In an example, operations may further include selecting the biomimicry design principle from a plurality of biomimicry design principles having naturally occurring characteristics that address at least one problem currently solved by the technology in a different way than the technology currently solves the at least one problem.

In an example, operations may further include receiving a direction for the user to travel in the virtual reality environment, and rendering a naturally occurring plant, animal, and/or object in the simulated natural ecosystem corresponding to the direction the user travels in the virtual reality environment.

In an example, operations may further include receiving a user selection of a naturally occurring plant, animal, and/or object in the simulated natural ecosystem, and outputting for the user the biomimicry design principle corresponding to the user selection of the naturally occurring plant, animal, and/or object in the simulated natural ecosystem.

In an example, operations may further include rendering a map for the user, and receiving a user selection of a location on a map for virtually exploring ecosystems, biomes, habitats, and/or natural locations to learn about different living organisms in their natural habitats.

In an example, operations may further include rendering in the virtual reality environment different living organisms for the user to virtually gather information about the different living organisms, the information including at least a function that the different living organisms has solved, the strategy of how the different living organisms solved the function, and an abstracted design principle (ADP) with all biology removed so that the user can utilize the information about the different living organisms in application ideas of the user.

In an example, operations may further include rendering for the user a hypothetical city of the future to explore that is based on a current city in the same state that the ecosystem is located.

In an example, operations may further include rendering for the user a virtual guide for the hypothetical city which points out sustainable, resilient, and regenerative features of the hypothetical city.

In an example, operations may further include rendering for the user a guide showing the user a future technology and asking the user to practice biomimicry by matching the future technology to an organism the user encountered in the natural ecosystem so that the participants see how an organism can inspire different technologies.

In an example, operations may further include displaying for the user a pop-up window highlighting specific information about each of the organisms in the ecosystem. The information collected can be the basis of the biomimicry research and is stored as data in the participant's field journal to be accessed later.

In an example, operations may further include rendering for the user, a travel gateway to a future version of an urban environment for the user to match a biomimicry strategy to a design installation of the technology.

In an example, operations may further include generating a prize for the user when the user correctly matches an organism to the technology. The prize may be rendered as a virtual lens showing the user the urban environment as if the user was another species.

It is noted that the examples shown and described are provided for purposes of illustration and are not intended to be limiting. Still other examples are also contemplated.

The invention claimed is:

1. A method of providing a user with an interactive virtual reality (VR) environment based on biomimicry, comprising:

generating, via at least one VR output device, a virtual reality environment for the user simulating a natural ecosystem;

receiving, via at least one VR input device, a user selection of a biomimicry design principle from the simulated natural ecosystem, the selection including gathering an abstracted design principle (ADP) configured as a design prompt with all biology removed so that the user can utilize the design prompt to brainstorm application ideas;

storing the ADP and biomimicry design principle as data in an electronic field journal stored in computer-readable memory;

accessing the electronic field journal within a simulation of an urban environment to match the stored data to a technology based on a strategy of how a living organism solved a function;

processing the user selection of the biomimicry design principle, via at least one computer processor, to apply the biomimicry design principle to a technology in an urban environment; and rendering for the user, via the at least one VR output device, a simulation of the urban environment with the technology incorporating the biomimicry design principle; and generating a virtual prize for the user when the user correctly matches the biomimicry design principle to the technology, the virtual prize rendered via the at least one VR output device as a special virtual lens that modifies the VR output device to re-render the urban environment to simulate the sensory perception of a non-human species.

2. The method of claim 1, wherein processing, via the at least one computer processor, further comprises matching the biomimicry design principle with the technology based on the ability of the biomimicry design principle to address a problem solved by the technology when the biomimicry design principle is incorporated into the technology.

3. The method of claim 1, wherein processing, via the at least one computer processor, further comprises selecting the biomimicry design principle from a plurality of biomimicry design principles having naturally occurring characteristics that address at least one problem currently solved by the technology in a different way than the technology currently solves the at least one problem.

4. The method of claim 1, further comprising:

receiving, via a motion detector, a direction for the user to travel in the virtual reality environment; and rendering, via the at least one VR output device, a naturally occurring plant, animal, and/or object in the simulated natural ecosystem corresponding to the direction the user travels in the virtual reality environment.

5. The method of claim 1, further comprising:

receiving, via a position of a user tracking device, a user selection of a naturally occurring plant, animal, and/or object in the simulated natural ecosystem; and outputting for the user, via a VR display and/or a VR audio device, the biomimicry design principle corresponding to the user selection of the naturally occurring plant, animal, and/or object in the simulated natural ecosystem.

6. The method of claim 1, further comprising:

rendering a map for the user, via a VR display; and receiving, via a user tracking device, a user selection of a location on a map for virtually exploring ecosystems, biomes, habitats, and/or natural locations to learn about different living organisms in their natural habitats.

7. The method of claim 1, further comprising rendering in the virtual reality environment, via the VR output device, different living organisms for the user to virtually gather information about the different living organisms, the information including at least a function that the different living organisms has solved, the strategy of how the different living organisms solved the function, and an abstracted design principle (ADP) with all biology removed so that the user can utilize the information about the different living organisms in application ideas of the user.

8. The method of claim 7, further comprising rendering for the user, via the at least one VR output device, a virtual guide for the hypothetical city which points out sustainable, resilient, and regenerative features of the hypothetical city.

9. The method of claim 1, further comprising rendering for the user, via the at least one VR output device, a hypothetical city of the future to explore that is based on a current city in the same state that the ecosystem is located.

10. The method of claim 9, further comprising rendering for the user, via the at least one VR output device, the guide showing the user a future technology and asking the user to practice biomimicry by matching the future technology to an organism the user encountered in the natural ecosystem so that the participants see how an organism can inspire different technologies.

11. The interactive virtual reality environment based on biomimicry of claim 1, further comprising a pop-up window highlighting specific information about each of the organisms in the ecosystem, wherein the information collected is the basis of the biomimicry research and is stored as data in the participant's field journal to be accessed later.

12. The method of claim 1, further comprising rendering for the user, via the at least one VR output device, a travel gateway to a future version of an urban environment for the user to match a biomimicry strategy to a design installation of the technology.

13. The method of claim 1, further comprising generating the virtual prize for the user when the user correctly matches an organism to the technology.

14. An interactive virtual reality (VR) environment based on biomimicry, comprising:

at least one VR output device to generate a virtual reality environment for the user simulating a natural ecosystem;

at least one VR input device to receive a user selection of a biomimicry design principle from the simulated natural ecosystem, the selection including gathering an abstracted design principle (ADP) configured as a design prompt with all biology removed so that the user can utilize the design prompt to brainstorm application idea;

at least one computer processor to store the ADP and biomimicry design principle as data in an electronic field journal in computer-readable memory;

the at least one computer processor configured to access the electronic field journal within a simulation of an urban environment to match the stored data to a technology based on a strategy of how a living organism solved a function;

at least one computer processor to process the user selection of the biomimicry design principle and apply the biomimicry design principle to a technology in an urban environment; and a computer-generated simulation of the urban environment showing the technology incorporating the biomimicry design principle; and the at least one computer processor configured to generate a virtual prize for the user when the user correctly matches the biomimicry design principle to the technology, the virtual prize rendered via the at least one VR output device as a special virtual lens that modifies the VR output to re-render the urban environment by applying a software-driven sensory filter that translates biological strategies into a visual user interface to simulate sensory perception of a non-human species.

15. The interactive virtual reality (VR) environment based on biomimicry of claim 14, wherein the at least one computer processor matches the biomimicry design principle with the technology based on the ability of the biomimicry design principle to address a problem solved by the technology when the biomimicry design principle is incorporated into the technology.

16. The interactive virtual reality (VR) environment based on biomimicry of claim 14, wherein the at least one computer processor selects the biomimicry design principle from a plurality of biomimicry design principles having naturally occurring characteristics that address at least one problem currently solved by the technology in a different way than the technology currently solves the at least one problem.

17. The interactive virtual reality (VR) environment based on biomimicry of claim 14, further comprising a motion detector receiving a direction for the user to travel in the virtual reality environment, wherein the at least one VR output device renders a naturally occurring plant, animal, and/or object in the simulated natural ecosystem corresponding to the direction the user travels.

18. The interactive virtual reality (VR) environment based on biomimicry of claim 14, further comprising:

a user tracking device to generate a user selection of a naturally occurring plant, animal, and/or object in the simulated natural ecosystem; and a VR display and/or a VR audio device outputting the biomimicry design principle corresponding to the user selection of the naturally occurring plant, animal, and/or object in the simulated natural ecosystem.

19. The interactive virtual reality (VR) environment based on biomimicry of claim 14, further comprising:

a VR display to render a map for the user; and a user tracking device to provide a user selection of a location on a map for virtually exploring ecosystems, biomes, habitats, and/or natural locations to learn about different living organisms in their natural habitats.

* * * * *